United States Patent
Bizlewicz

[11] Patent Number: 5,929,395
[45] Date of Patent: Jul. 27, 1999

[54] VIBRATIONAL ENERGY ABSORPTION PLATFORM

[76] Inventor: F. Peter Bizlewicz, 1209 Pines Lake Dr. West, Wayne, N.J. 07470

[21] Appl. No.: 08/999,361

[22] Filed: Dec. 29, 1997

[51] Int. Cl.[6] ............................................. F16F 15/00
[52] U.S. Cl. ............................ 181/207; 181/208; 248/638
[58] Field of Search ................................ 181/207, 208, 181/290, 294, 286; 248/559, 636, 638

[56] References Cited

U.S. PATENT DOCUMENTS 4,778,028 10/1988 Staley ........................................ 181/208
5,681,023 10/1997 Sheydayi ................................... 248/638
5,691,037 11/1997 McCutcheon et al. ..................... 181/208

*Primary Examiner*—Khanh Dang
*Attorney, Agent, or Firm*—Arthur Jacob

[57] ABSTRACT

A platform is interposed between an electronic component of a sound reproduction system and a support structure to absorb unwanted vibrational energy originating in the electronic component and thereby enhance the sonic performance of the electronic component, the platform having a body constructed of a plurality of layers integrated into the body and having densities progressing from higher densities at outer layers to lower densities at inner layers, with an inner layer recessed relative to the outer layers for facilitating the absorption of unwanted vibrational energy.

14 Claims, 2 Drawing Sheets

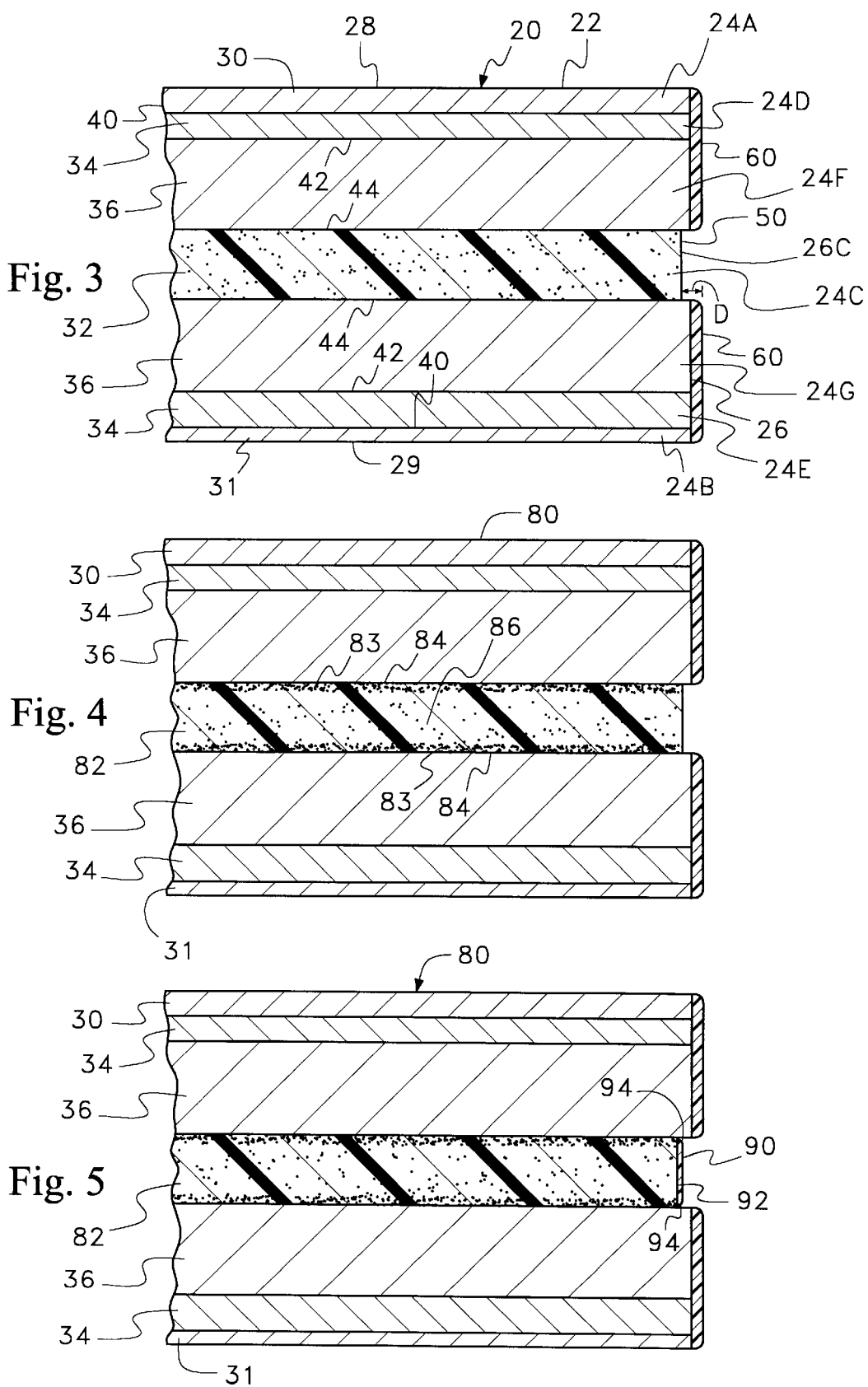

VIBRATIONAL ENERGY ABSORPTION PLATFORM

The present invention relates generally to the reproduction of sound through the use of electronic components and pertains, more specifically, to the reduction of deleterious effects on sound reproduction resulting from vibrational energy generated by such electronic components.

It is known that microphonic vibrations in electronic equipment utilized for the reproduction of sound impair the sonic performance of such equipment. These deleterious microphonic vibrations are caused not only by the transmission of vibrational energy from external sources to electronic components of the sound reproduction system, but are present as a result of vibrational energy generated within the electronic components themselves. Thus, amplifiers, preamplifiers, CD players and the like include component parts, such as transformers and internal circuitry, which can be the source of deleterious vibrational energy.

Various isolation platforms and feet having elastomeric parts have been utilized in an effort to isolate electronic components from external vibrational energy. However, such platforms and feet are not designed to absorb vibrations which originate in the electronic components themselves. Thus, while isolation platforms and feet can be effective in decoupling equipment from external sources of vibrational energy, such as footfalls and shock, these expedients do little to absorb unwanted vibrational energy emanating from the electronic components. In some instances, these devices actually reflect such vibrational energy back into the sound reproduction equipment, causing additional impairment of sonic performance.

Unlike previous isolation platforms and feet, the present invention serves to absorb vibrational energy originating in electronic components of sound reproduction equipment. As such, the present invention attains several objects and advantages, some of which are summarized as follows: Provides a vibrational energy absorption platform for electronic components of sound reproduction equipment to absorb unwanted vibrational energy and thereby improve sonic performance of the equipment; serves to absorb and dissipate vibrational energy originating in the electronic components themselves for enhanced sonic performance; reduces vibrational energy in components of sound reproduction such that a listener will hear more air and timbral purity, better focus, a blacker background with improved depth layering, plus greater clarity and delineation; provides a mechanically relatively simple platform readily adapted for use with a wide variety of sound reproduction components without requiring modification of such components; enables the economical manufacture of rugged and effective vibrational energy absorption platforms of consistent high quality capable of exemplary performance throughout a relatively long service life.

The above objects and advantages, as well as further objects and advantages, are attained by the present invention which may be described briefly as a platform for interposition between an electronic component and a support structure to absorb unwanted vibrational energy originating in the electronic component, the platform comprising: a body having a longitudinal length and a lateral width for interposition between the electronic component and the support structure, the body further having an altitudinal height for extending between the electronic component and the support structure; the body including a plurality of layers extending longitudinally and laterally, each layer having a longitudinal length and a lateral width establishing an outer periphery, and an altitudinal thickness, the plurality of layers being joined integrally into the body; the plurality of layers including at least one altitudinally outer layer, an altitudinally inner layer, and intermediate layers located altitudinally between the outer layer and the inner layer; the plurality of layers each having a prescribed density, with the densities of the layers progressing from a highest density at the outer layer to a lowest density at the inner layer so as to maximize the absorption of the unwanted vibrational energy; the longitudinal length and the lateral width of the inner layer being less than the longitudinal length and the lateral width of the outer layer and the intermediate layers so as to establish a recess in the body, along the outer periphery of the inner layer relative to the outer periphery of the outer layer and outer periphery of the intermediate layers for enhancing the absorption of the unwanted vibrational energy.

The invention will be understood more fully, while still further objects and advantages will become apparent, in the following detailed description of preferred embodiments of the invention illustrated in the accompanying drawing, in which:

FIG. 3 is an enlarged fragmentary cross-sectional view taken along line 3—3 of FIG. 1;

FIG. 4 is an enlarged fragmentary cross-sectional view similar to FIG. 3, and showing another embodiment of the invention;

FIG. 5 is an enlarged fragmentary cross-sectional view similar to FIG. 3, and showing still another embodiment of the invention.

Figure 1:
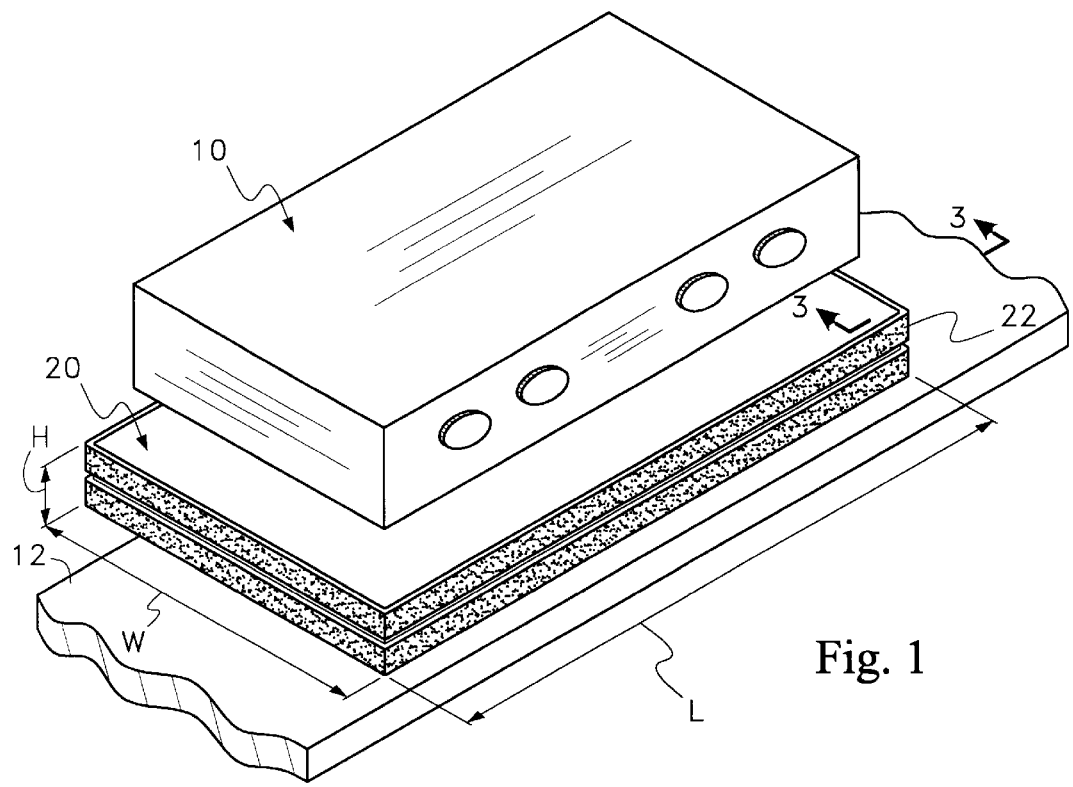
FIG. 1 is an exploded pictorial view showing an electronic component to be supported upon a support structure with an interposed vibrational energy absorption platform constructed in accordance with the present invention.
Figure 2:
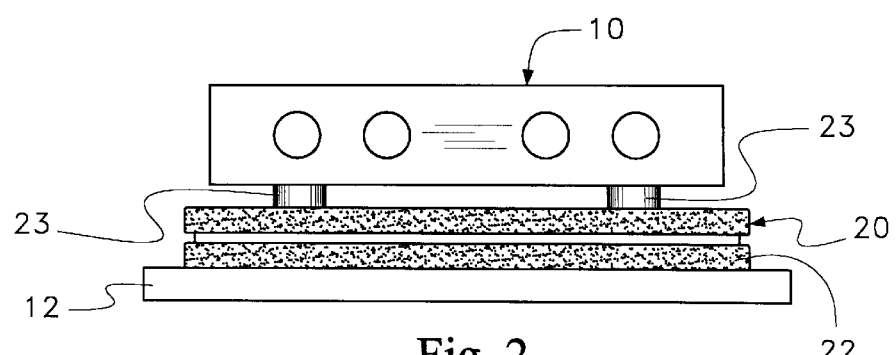
FIG. 2 is a front elevational view of the electronic component supported upon the support structure with the vibrational energy absorption platform interposed.

Referring now to the drawing, and especially to FIGS. 1 and 2 thereof, an electronic component of a sound reproduction system is illustrated in the form of an amplifier 10. When installed in the sound reproduction system (not shown) amplifier 10 is supported upon a support structure shown in the form of a shelf 12. In order to enhance the sonic performance of the sound reproduction system, a vibrational energy absorption platform 20, constructed in accordance with the present invention, is interposed between the amplifier 10 and the shelf 12.

Platform 20 includes a relatively rigid body 22 having a longitudinal length L, a lateral width W and an altitudinal height H, the length L and the width W being sufficient to extend the platform 20 fully beneath the amplifier 10 for interposition of the platform 20 between the amplifier 10 and the shelf 12, with the platform 20 resting upon shelf 12 and amplifier 10 resting upon the platform 20, and coupled to the platform 20 by feet 23, as illustrated in FIG. 2. Body 22 is comprised of a plurality of layers 24A, 24B, 24C, 24D, 24E, 24F and 24G (see FIG. 3) extending longitudinally and laterally, each layer 24A, 24B, 24C, 24D, 24E, 24F and 24G having an outer periphery 26A, 26B, 26C, 26D, 26E, 26F and 26G, and the layers 24A, 24B, 24C, 24D, 24E, 24F and 24G are joined together to establish the integral body 22 of the platform 20, the integral body having an upper surface 28 and an altitudinally opposite lower surface 29.

Turning now to FIG. 3, the plurality of layers 24A through 24G of body 22 includes altitudinally outer layers 24A and 24B in the form of relatively thin sheets 30 and 31, an altitudinally inner layer 24C in the form of a relatively thicker central core 32, and intermediate layers 24D through 24G in the form of elements 34 and 36. The sheets 30 and 31, core 32 and elements 34 and 36 are secured together, as by bonding along the boundaries 40, 42 and 44, between the layers 24A and 24D, 24B and 24E, 24D and 24F, 24E and 24G, 24F and 24C, and 24G and 24C. Each of the layers 24A through 24G has a prescribed density and the densities of the layers 24A through 24G are progressively less from the highest density at the sheets 30 and 31 to the lowest density at the core 32, with intermediate densities at the elements 34 and 36. The changes in density progressively through the altitudinal height H of the platform 20 establish a structural arrangement which maximizes the absorption of vibrational energy emanating from the amplifier 10, which absorbed vibrational energy then is dissipated in the form of heat. The reflection of vibrational energy back to the amplifier 10 is deterred by the boundaries 40, 42 and 44 between the layers 24A through 24G of different densities. In a like manner, vibrational energy which may emanate from the shelf 12 is absorbed and dissipated, and the reflection of such vibrational energy back toward the shelf 12 is deterred.

The absorption and dissipation of vibrational energy is enhanced by recessing the core 32 relative to the elements 34 and 36, and relative to sheets 30 and 31. Thus, the longitudinal length and lateral width of the core 32 are less than the longitudinal length and lateral width of the elements 34 and 36, and the sheets 30 and 31, so as to establish a recess 50 in the body 22, along the outer periphery 26C of the core 32. Further enhancement of the ability of platform 20 to absorb vibrational energy is accomplished by providing an edging 60 integrated with the sheets 30 and 31 and the elements 34 and 36, along the respective outer peripheries.

In a preferred construction, platform 20 includes sheet 30 located along the upper surface 28 and sheet 31 located along the lower surface 29 and the sheets 30 and 31 are constructed of a metallic material having a density greater than the density any of the remaining layers 24C through 24G. A preferred material for sheets 30 and 31 is aluminum, with the upper sheet 30 having a thickness of about 0.120 inch and the lower sheet 31 having a thickness of about 0.040 inch. The core 32 preferably is constructed of a synthetic polymeric foam material, a suitable material being available commercially under the trademark GATORFOAM, having a thickness of about 0.5 inch. The elements 34 preferably are constructed of tempered hardboard, such as that available commercially under the trademark DURON, the elements 34 having a thickness of about 0.125 inch. The elements 36 preferably are constructed of medium density fiberboard and have a thickness of about 0.75 inch. The preferred depth D of recess 50 is about 0.125 inch. The preferred material for edging 60 is a synthetic polymeric material, such as a textured polystyrene, having a thickness of about 0.030 inch.

In the embodiment of FIG. 4, body 80 includes sheets 30 and 31, and elements 34 and 36 as described above in connection with body 22. However, core 82 is constructed of a synthetic polymeric foam which has been compressed so as to be slightly more dense in regions 83 adjacent the boundaries 84 than at the central portion 86, thereby providing an additional density gradient for more enhanced absorption of vibrational energy. In the preferred construction, the material of core 82 has been compressed from an initial thickness of about 1.5 inches to a final thickness of about 1.25 inches.

Turning now to FIG. 5, still further enhancement of the ability of the body 80 to absorb vibrational energy is attained by providing an edging 90 along the outer peripheral edge 92 of the core 82. A preferred material for edging 90 is a synthetic polymeric material, such as a textured polystyrene, having a thickness of about 0.030 inch. The edging 90 is recessed relative to the adjacent elements 36, and the upper and lower edges 94 of the edging 90 preferably are spaced slightly from the adjacent elements 36.

Figure 6:
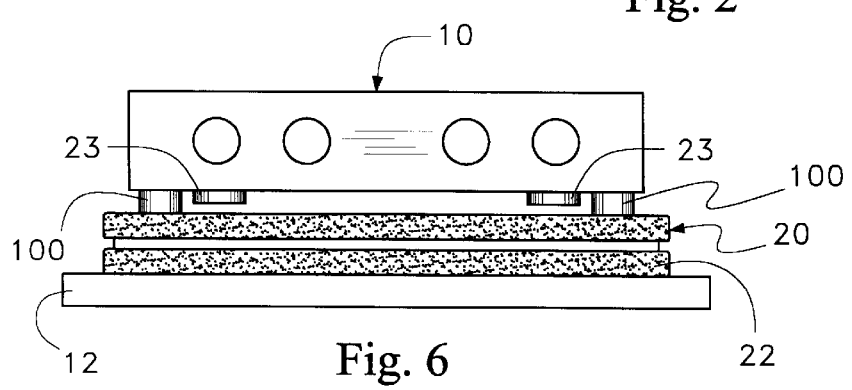
FIG. 6 is a front elevational view similar to FIG. 2, and showing an alternate arrangement.

Referring now to FIG. 6, an alternate arrangement for coupling amplifier 10 to platform 20 includes the use of coupling members 100, each constructed in the form of a block of metal having a density at least equal to, and preferably greater than, the density of the material of sheet 30. In the preferred arrangement, four coupling members 100 are utilized, with one coupling member 100 located closely adjacent each corner of the amplifier 10. In this manner, the chassis of amplifier 10 is mechanically coupled directly to the platform 20 for direct transmission of vibrational energy from the amplifier 10 to the platform 20, bypassing any elastomeric elements which ordinarily are found in feet 23, for enhanced performance of the sound reproduction system. Likewise, the provision of metallic sheet 31 enables the use of further metallic coupling devices between the sheet 31 and a supporting structure, such as shelf 12, for better coupling between the platform 20 and the supporting structure, and concomitant enhanced performance of the sound reproduction system.

It will be seen that the present invention attains the several objects and advantages summarized above, namely: Provides a vibrational energy absorption platform for electronic components of sound reproduction equipment to absorb unwanted vibrational energy and thereby improve sonic performance of the equipment; serves to absorb and dissipate vibrational energy originating in the electronic components themselves for enhanced sonic performance; reduces vibrational energy in components of sound reproduction such that a listener will hear more air and timbral purity, better focus, a blacker background with improved depth layering, plus greater clarity and delineation; provides a mechanically relatively simple platform readily adapted for use with a wide variety of sound reproduction components without requiring modification of such components; enables the economical manufacture of rugged and effective vibrational energy absorption platforms of consistent high quality capable of exemplary performance throughout a relatively long service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A platform for interposition between an electronic component and a support structure to absorb unwanted vibrational energy originating in the electronic component, the platform comprising:

a body having a longitudinal length and a lateral width for interposition between the electronic component and the support structure, the body further having an altitudinal height for extending between the electronic component and the support structure;

the body including a plurality of layers extending longitudinally and laterally, each layer having a longitudinal length and a lateral width establishing an outer periphery, and an altitudinal thickness, the plurality of layers being joined integrally into the body;

the plurality of layers including at least one altitudinally outer layer, an altitudinally inner layer, and intermediate layers located altitudinally between the outer layer and the inner layer;

the plurality of layers each having a prescribed density, with the densities of the layers progressing from a highest density at the outer layer to a lowest density at the inner layer so as to maximize the absorption of the unwanted vibrational energy;

the longitudinal length and the lateral width of the inner layer being less than the longitudinal length and the lateral width of the outer layer and the intermediate layers so as to establish a recess in the body, along the outer periphery of the inner layer relative to the outer periphery of the outer layer and outer periphery of the intermediate layers for enhancing the absorption of the unwanted vibrational energy.

2. The invention of claim 1 wherein:

the body includes altitudinally upper and lower outer surfaces;

the inner layer comprises a core layer intermediate the upper and lower outer surfaces; and the plurality of layers includes an outer layer located at each of the upper and lower outer surfaces, and the intermediate layers are located between each outer layer and the core layer.

3. The invention of claim 1 including an edging material integral with the outer layer and the intermediate layers, the edging material extending along the outer periphery of the outer layer and the outer periphery of the intermediate layers.

4. The invention of claim 3 including a further edging material integral with the inner layer and extending along the outer periphery of the inner layer.

5. The invention of claim 1 wherein:

the body includes altitudinally upper and lower outer surfaces;

the inner layer comprises a core layer intermediate the upper and lower outer surfaces; and the plurality of layers includes an outer layer located at each of the upper and lower outer surfaces, and the intermediate layers are located between each outer layer and the core layer.

the invention including:

an edging material integral with the outer layers and the intermediate layers, the edging material extending along the outer periphery of the outer layer and the outer periphery of the intermediate layers.

6. The invention of claim 5 including a further edging material integral with the inner layer and extending along the outer periphery of the inner layer.

7. A platform for interposition between an electronic component and a support structure to absorb unwanted vibrational energy originating in the electronic component, the platform comprising:

a body having a longitudinal length and a lateral width for interposition between the electronic component and the support structure, the body further having an altitudinal height for extending between the electronic component and the support structure;

the body including a plurality of layers extending longitudinally and laterally, each layer having a longitudinal length and a lateral width establishing an outer periphery, and an altitudinal thickness, the plurality of layers being joined integrally into the body;

the plurality of layers including at least one altitudinally outer layer, an altitudinally inner layer, and intermediate layers located altitudinally between the outer layer and the inner layer;

the plurality of layers each having a prescribed density, with the densities of the layers progressing from a highest density at the outer layer to a lowest density at the inner layer so as to maximize the absorption of the unwanted vibrational energy;

the longitudinal length and the lateral width of the inner layer being less than the longitudinal length and the lateral width of the outer layer and the intermediate layers so as to establish a recess in the body, along the outer periphery of the inner layer relative to the outer periphery of the outer layer and outer periphery of the intermediate layers for enhancing the absorption of the unwanted vibrational energy;

the outer layer being constructed of a metallic material;

the inner layer being constructed of a synthetic polymeric foam material; and the intermediate layers including a first intermediate layer adjacent the outer layer and constructed of tempered hardboard, and a second intermediate layer adjacent the inner layer, altitudinally between the first intermediate layer and the inner layer, and constructed of medium density fiberboard.

8. The invention of claim 7 wherein the metallic material is aluminum.

9. The invention of claim 7 wherein the inner layer is compressed adjacent the intermediate layers.

10. The invention of claim 7 wherein:

the body includes altitudinally upper and lower outer surfaces;

the inner layer comprises a core layer intermediate the upper and lower outer surfaces; and the plurality of layers includes an outer layer located at each of the upper and lower outer surfaces, and the intermediate layers are located between each outer layer and the core layer.

11. The invention of claim 7 including an edging material integral with the outer layer and the intermediate layers, the edging material extending along the outer periphery of the outer layer and the outer periphery of the intermediate layers.

12. The invention of claim 11 including a further edging material integral with the inner layer and extending along the outer periphery of the inner layer.

13. The invention of claim 12 wherein the metallic material is aluminum.

14. The invention of claim 12 wherein the inner layer is compressed adjacent the intermediate layers.

* * * * *